US012309552B2

(12) United States Patent
Bhowmik et al.

(10) Patent No.: US 12,309,552 B2
(45) Date of Patent: May 20, 2025

(54) HEARING DEVICE WITH DYNAMIC NEURAL NETWORKS FOR SOUND ENHANCEMENT

(71) Applicant: Starkey Laboratories, Inc., Eden Prairie, MN (US)

(72) Inventors: Achin Bhowmik, Eden Prairie, MN (US); Daniel Marquardt, Eden Prairie, MN (US); Deepak Kadetotad, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 247 days.

(21) Appl. No.: 18/027,314

(22) PCT Filed: Aug. 25, 2021

(86) PCT No.: PCT/US2021/047450
§ 371 (c)(1),
(2) Date: Mar. 20, 2023

(87) PCT Pub. No.: WO2022/081260
PCT Pub. Date: Apr. 21, 2022

(65) Prior Publication Data

US 2023/0362559 A1 Nov. 9, 2023

Related U.S. Application Data

(60) Provisional application No. 63/092,583, filed on Oct. 16, 2020.

(51) Int. Cl.
*H04R 25/00* (2006.01)
*G10L 21/0208* (2013.01)
*G10L 25/30* (2013.01)

(52) U.S. Cl.
CPC ........ *H04R 25/507* (2013.01); *G10L 21/0208* (2013.01); *G10L 25/30* (2013.01); *H04R 2225/41* (2013.01); *H04R 2225/43* (2013.01)

(58) Field of Classification Search
CPC .......................... H04R 25/505; H04R 25/507; H04R 2225/41; H04R 2225/43; H04R 2225/59
See application file for complete search history.

(56) References Cited

U.S. PATENT DOCUMENTS 5,745,652 A 4/1998 Bigus
7,778,946 B2 8/2010 Hercus
(Continued)

FOREIGN PATENT DOCUMENTS

EP 0712261 A1 5/1996
EP 3229496 A1 10/2017
(Continued)

OTHER PUBLICATIONS

International Patent Application No. PCT/US2021/047450, filed Aug. 25, 2021; International Search Report and Written Opinion, issued Nov. 26, 2021; 10 pages.

*Primary Examiner* — Ryan Robinson
(74) *Attorney, Agent, or Firm* — Mueting Raasch Group

(57) ABSTRACT

An audio processing path receives an audio signal from a microphone of an ear-wearable device and reproduces the audio signal at a receiver that is placed within an ear of a user. A deep neural network (DNN) is coupled to the audio processing path that performs speech enhancement on the audio signal. An audio feature detector is operable to detect an audio change via the processing path that triggers a change of state of the DNN. The change of state affects resource consumption by the DNN. The change of state is applied to the DNN, and the DNN performs the speech enhancement in the changed state.

22 Claims, 6 Drawing Sheets

(56) References Cited

U.S. PATENT DOCUMENTS

| | | | | |
|---|---|---|---|---|
| 10,268,951 | B2 | 4/2019 | Sekiyama | |
| 10,366,322 | B2 | 7/2019 | David | |
| 10,492,008 | B2 | 11/2019 | Xu | |
| 10,558,914 | B2 | 2/2020 | Sekiyama | |
| 10,580,427 | B2 | 3/2020 | Giri | |
| 10,614,798 | B2 | 4/2020 | Seo | |
| 2017/0061978 | A1 | 3/2017 | Wang | |
| 2017/0295439 | A1* | 10/2017 | Xu | H04R 25/407 |
| 2018/0121796 | A1 | 5/2018 | Deisher | |
| 2019/0041961 | A1 | 2/2019 | Desai | |
| 2019/0236438 | A1 | 8/2019 | Odena | |
| 2019/0261096 | A1* | 8/2019 | Aschoff | H04R 25/55 |
| 2020/0260198 | A1 | 8/2020 | Andersen | |
| 2023/0292074 | A1* | 9/2023 | Marquardt | H04S 7/30 |

FOREIGN PATENT DOCUMENTS

| | | | |
|---|---|---|---|
| EP | 3543917 | A1 | 3/2019 |
| WO | WO 2017/214728 | A1 | 12/2017 |
| WO | WO 2019/157599 | A1 | 8/2019 |
| WO | WO 2019/246491 | A1 | 12/2019 |

* cited by examiner

| | Event | Δ Resources / Δ DNN Complexity |
|---|---|---|
| 600 | Increased SNR | ↓ |
| 601 | Decreased SNR | ↑ |
| 602 | Background Noise Non-stationary | ↑ |
| 603 | Background Noise Stationary | ↓ |
| 604 | Background Noise Short Term | ↓ |
| 605 | Background Noise Long Term | ↑ |
| 606 | Hearing Loss of the User High | ↑ |
| 607 | Hearing Loss of the User Low | ↓ |
| 608 | Battery Power Remaining High | ↑ |
| 609 | Battery Power Remaining Low | ↓ |

HEARING DEVICE WITH DYNAMIC NEURAL NETWORKS FOR SOUND ENHANCEMENT

RELATED APPLICATIONS

This application is the 371 U.S. National Stage of International Application No. PCT/US2021/047450, filed Aug. 25, 2021, which claims the benefit of U.S. Provisional Application No. 63/092,583, filed Oct.16, 2020, the contents of which are hereby incorporated by reference.

SUMMARY

This application relates generally to ear-wearable electronic systems and devices, including hearing aids, personal amplification devices, and hearables. In one embodiment, methods and ear-wearable devices utilize an audio processing path that receives an audio signal from a microphone of an ear-wearable device and reproduces the audio signal at a receiver that is placed within an ear of a user. A deep neural network (DNN) is coupled to the audio processing path that performs speech enhancement on the audio signal. An audio feature detector is operable to detect an audio change via the processing path that triggers a change of state of the DNN. The change of state affects resource consumption by the DNN. The change of state is applied to the DNN, and the DNN performs the speech enhancement in the changed state.

In another embodiment, audio is received from a microphone of an ear-wearable device. The microphone produces an audio signal. Speech enhancement of the audio signal is performed by a deep neural network (DNN) that is in a first state with a first complexity. The speech-enhanced audio signal is reproduced in an ear of a user via a receiver. A change to the audio signal is detected that triggers the speech enhancement being performed with a second complexity of the DNN. The DNN is changed to a second state with the second complexity. The second complexity affects resource consumption of the ear-wearable device by the DNN. The speech enhancement of the changed audio signal is performed by the DNN in the second state.

In another embodiment, an audio signal is received from a microphone of an ear-wearable device. Speech enhancement is performed on the audio signal via a deep neural network (DNN). The speech-enhanced audio signal is reproduced at a receiver that is placed within a user's ear. An available battery power of the ear-wearable device is detected, and based on the available battery power reaching a threshold, a state of the DNN is changed which affects resource consumption by the DNN.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
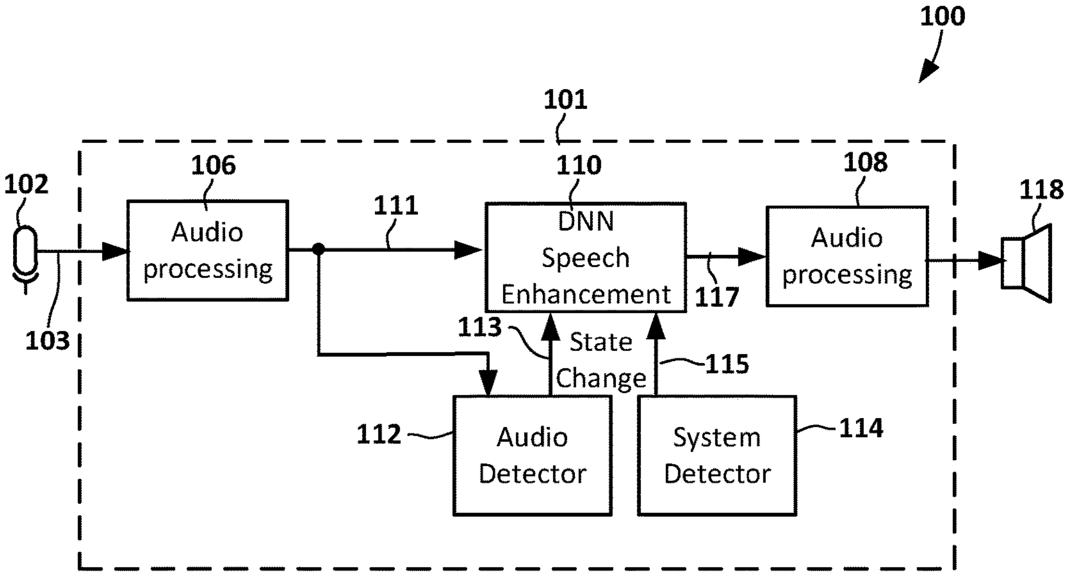
FIG. 1 is a schematic diagram of an audio processing path according to an example embodiment.

Embodiments disclosed herein are directed to speech enhancement in an ear-worn or ear-level electronic device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing devices" or "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

Typical components of a hearing device can include a processor (e.g., a digital signal processor or DSP), memory circuitry, power management and charging circuitry, one or more communication devices (e.g., one or more radios, a near-field magnetic induction device), one or more antennas, one or more microphones, buttons and/or switches, and a receiver/speaker, for example. Hearing devices can incorporate a long-range communication device, such as a Bluetooth® transceiver or other type of radio frequency (RF) transceiver.

The term hearing device of the present disclosure refers to a wide variety of ear-level electronic devices that can aid a person with impaired hearing. The term hearing device also refers to a wide variety of devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which are used interchangeably and understood to refer to a system comprising a single left ear device, a single right ear device, or a combination of a left ear device and a right ear device.

Speech enhancement (SE) is an audio signal processing technique that aims to improve the quality and intelligibility of speech signals, e.g., in the presence of noise and/or distortion. Due to its application in several areas such as automatic speech recognition (ASR), mobile communication, hearing aids, etc., several methods have been proposed for SE over the years. Recently, the success of deep neural networks (DNNs) in automatic speech recognition led to investigation of DNNs for noise suppression for ASR and speech enhancement. Generally, corruption of speech by noise is a complex process and a complex non-linear model like DNN is well suited for modeling it.

The present disclosure includes descriptions of embodiments that utilize a DNN to enhance sound processing. Although in hearing devices this commonly involves enhancing the user's perception of speech using a DNN, such enhancement techniques can be used in specialty applications to enhance any type of sound whose signals can be characterized, such as music, animal noises (e.g., bird calls), machine noises, pure or mixed tones, etc. Generally, this involves emphasizing the sound components of interest, e.g., speech, while deemphasizing other components of the sound, e.g., ambient noise, random/electrical noise, etc.

A DNN is a form of machine learning in which a computer model is set up to model a network of interconnected neurons. As used herein, the term "DNN" may encompass any combination of a multi-layered perceptron network, feedforward neural network, convolutional neural network, and recurrent neural network. A training process is used to feed data (e.g., sound signals and/or data derived from the signals) into a network, which uses an error evaluation method (e.g., gradient descent, back propagation) to adjust the weights used by the neurons when 'firing.' A trained DNN can be fed new data outside the training set during use. If the proper network type and structure was selected and the training data was a good representation of the real-world data, the DNN can make predictions about the real-world data, e.g., predicting which components of the sound are speech components. This prediction is sometimes referred to as model inference.

While training of a DNN can be quite computationally intensive, the model inference usage of an already-trained DNN is much less so, such that even relatively low-powered devices such as mobile phones can handle some level of DNN model inference. However, hearing devices such as hearing aids have relatively low processing capability when compared even to a mobile phone. This is due, for example to the small size of the devices, the desire for the devices to operate continuously for long periods of time, etc. Thus, even though a trained DNN can perform model inference in some capacity on a hearing device, it is expected that technological advancements will be needed before DNNs can become widely adopted for sound enhancement on hearing devices.

Some of technological advances that can facilitate using DNNs in hearing devices include those advances that generally improve all mobile computing devices, e.g., smaller integrated circuit feature sizes, improvements in battery technology, etc. As pertains to DNNs in particular, specialized circuitry is being developed that can run DNNs and other machine learning technologies more efficiently than a general-purpose processor. Such specialized processors can provide orders-of-magnitude improvements in DNN performance by dedicating some additional wafer die space for specialized computational logic that is optimized to perform the types of mathematical and logical operations commonly performed by machine learning models.

Even with advanced DNN processing logic circuits, there will still be a desire to reduce the use of computing resources consumed by the DNN or other machine learning components. Those computing resources include cycles of processor operation (where the processor may include one or both of a specialized neural network processor and a more general-purpose system controller), amount of data needed to be stored in non-volatile memory, use of input/output (I/O) busses and controller logic, electrical power storage capacity, etc. Accordingly, embodiments described below utilize a dynamically variable DNN implementation that can operate in various states that trade off resource utilization with model inference performance (e.g., inference accuracy). These embodiments that can operate effectively on any devices that have significant limitations on power, processing capability, memory storage, etc., but may include some features that are tailored to hearing assistance technology.

In FIG. 1, a schematic diagram shows an audio processing path 101 of an ear-wearable device 100 according to an example embodiment. The audio processing path 101 receives an audio signal 103 from a microphone 102 of the ear-wearable device 100 and creates a reproduction 105 of the audio signal at a receiver 118 that is placed near or within an ear of a user. The audio processing path 101 includes audio processing sections 106, 108 that process respective input audio signal 103 and output audio signal 105. Coupled between the audio processing sections 106, 108 is a deep neural network (DNN) 110.

The DNN 110 is configured to perform sound enhancement, e.g., speech enhancement, on the audio signal 111 which is received from processing section 106. The DNN 110 produces enhanced speech 117 in real-time or near-real time. The enhancement may include any combination of emphasizing certain sounds, deemphasizing other sounds, noise reduction, frequency shifting, compression, equalization, etc. The DNN 110 may be configured to operate in the time domain, frequency domain and/or in a specialized domain defined by a latent representation used as input to the DNN 110. The DNN 110 may operate in various parts of the audio path, but typically on a digitized form of the audio signal.

An audio feature detector 112 is configured to detect an audio change via the processing path (e.g., from signal 111) that triggers a change a state 113 of the DNN 110. The change of state 113 affects resource consumption by the DNN 110. As will be described in detail below, the change in state may involve changing any combination of a sparsity of DNN 110, the number of bits used to represent data (e.g., weights, biases, calculating activation of neurons) in the DNN 110, the frequency that that the DNN 110 processes data, changes of internal updates within the DNN 110 (e.g., configured as a skip recursive neural network, or skip RNN). The DNN performs speech enhancement in the changed state, which may affect the efficacy of the speech enhancement inversely to the resource consumption.

A system detector 114 may also be configured to detect a system change via the processing path (e.g., from signal 115) that triggers a change a state of the DNN 110. The change of state 115 may also affect resource consumption by the DNN 110. The system changes determined by detector 114 may not be directly related to the audio signal, but may affect the overall operation of the device 100. For example, changes in remaining power levels, environment (e.g., temperature, vibration), available memory, current operational modes, etc., may also be used to trigger a change in the DNN 110.

Figure 2:
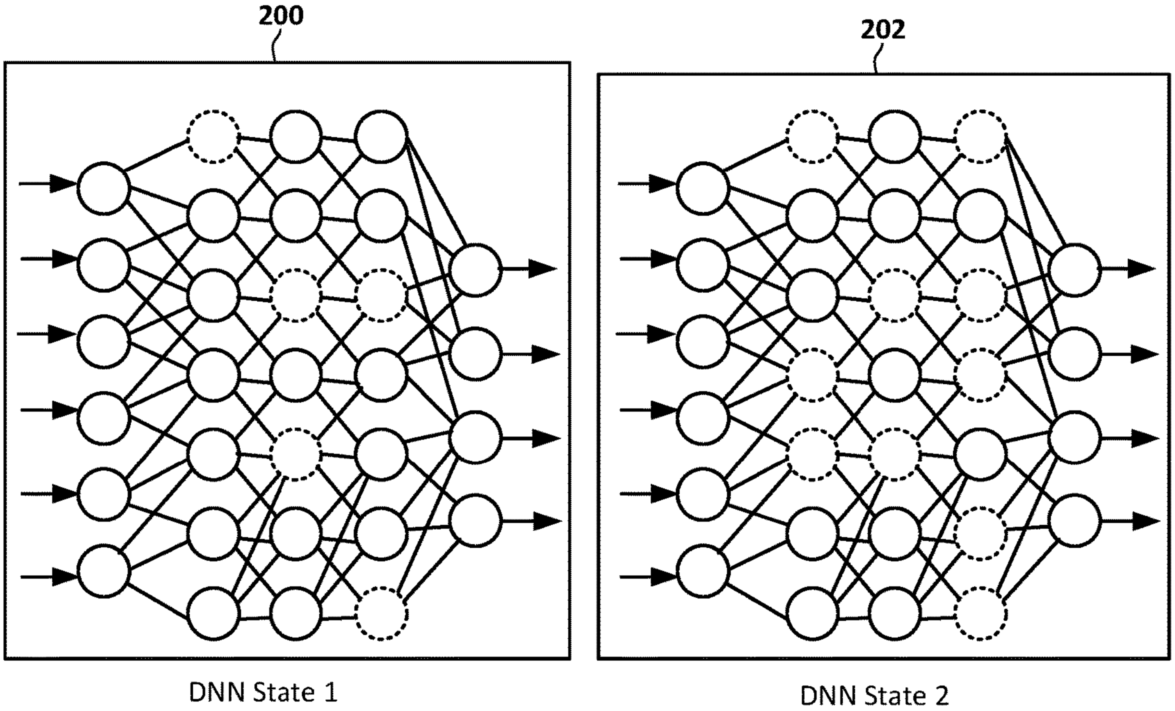
FIG. 2 is a block diagram showing a neural network with configurable sparseness according to an example embodiment.

In FIG. 2, a block diagram shows an example of DNN that changes sparsity in different states according to an example embodiment. Generally, sparsity refers to certain neurons/ nodes being turned off by setting weights to zero. In typical DNN nodes, the inputs to the neuron are combined using a function (e.g., sigmoid function) that is output to connected neurons in the next layer. The value of the output relative to the inputs (e.g., the amplification of the inputs in the activated output) is affected by a weighting value. If this weighting value is very low, the output of the neuron will also often be very low, thus the neuron may have little influence in the overall operation of the DNN. In some cases, these low-value weights can be set to zero without significantly degrading performance of the network. When the DNN is implemented in specialized hardware, zero-weighted nodes can be processed specially such that no logic clock cycles are used in calculating the output, which will always be zero (or always equal to a constant bias value of the node). The calculation of the outputs using the weights involves multiplications, which are relatively expensive in terms of processor cycles, and so sparsifying a DNN can reduce resource consumption each time data is propagated through the DNN.

In FIG. 2 a DNN is shown in a first state 200, where nodes of the network drawing in dotted lines are "turned off," e.g., by setting weights of the affected nodes to zero. In a second state 202, more neurons are turned off, thus the network in the second state 202 is sparser than the DNN in the first state 200. Note that a simplified diagram is used to illustrate the DNN in FIG. 2; DNNs will typically have many more nodes as well as having a larger number of interconnections, e.g., each node within one layer may be connected with every node of the next layer.

A number of criteria and techniques for sparsifying DNNs are known and are beyond the scope of this disclosure. Generally, a change in criteria can be used to provide different levels of sparsity for the same trained DNN. Generally, there may be an impact in performance (e.g., accuracy) of the DNN as more neurons are disabled, although the DNN may still perform well enough for some purposes. Particular events or conditions that might trigger the illustrated change in state are discussed further below, e.g., in the description of FIG. 6.

The transition between the two states 200, 202 may be accomplished in a number of ways. In one embodiment, transitioning between states 200, 202 may be accomplished by erasing previous matrix state data and copying the sparse DNN representation matrices corresponding to the new state into the DNN processing hardware. The data that describes the DNN may be stored in a non-volatile memory as a set of matrices or similar data structure. Any zero weights will be zero entries in a weight matrix, and thus a sparse matrix can be used to store the data from a sparse DNN. There are a number of known ways to store sparse matrices to reduce the memory footprint of the matrix, and these sparse representations/formats can also reduce the impact of transferring the DNN data in and out of the volatile memory used by the computing hardware.

There may be other ways to change DNN sparseness without copying in a new set of network data. For example, a small data structure, e.g., an n-bit number, can be associated with each neuron, each bit indicating whether the neuron should be active for a given state. For example, a four bit number could be used $\{x_1, x_2, x_3, x_4\}$, where each bit indicates a selectable state of the network. If a bit is set to zero for a particular state, then the neuron's weight will be treated as zero, and its stored weight value will be used otherwise. So a neuron with this variable set to {1111} will always be active, while a neuron with this variable set to {0011} will be active for the two rightmost (and less sparse) states, and will be zero-weighted for the other, more sparse, states. This may increase memory consumption in order to store these variables. However, these data structures may negate the need to copy data in and out of the DNN hardware to change state, therefore may be able to quickly affect state transitions. This scheme can be implemented in other ways, e.g., a set of global sparseness matrices that store a bit map of active neurons for different states.

Figure 3:
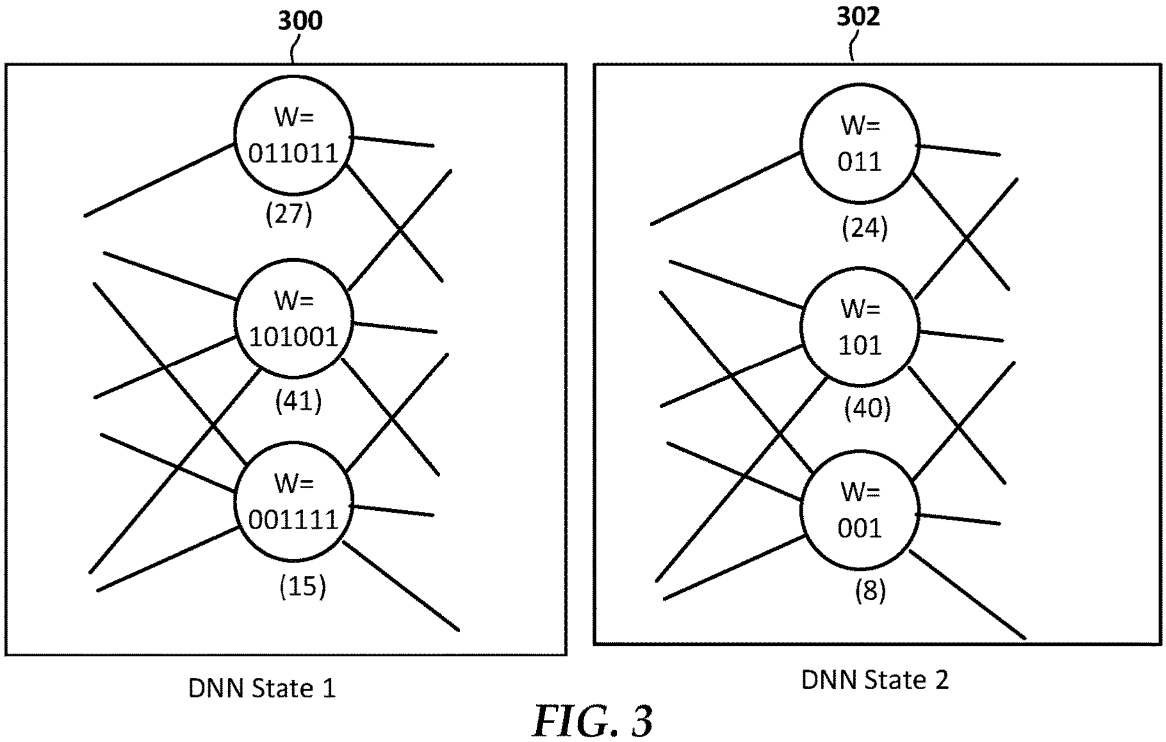
FIG. 3 is a diagram showing a neural network that uses variable precision weights according to an example embodiment.

Another factor that can affect the number of processor cycles need to do DNN calculations is the number of bits used to store each number. Generally, numbers represented using fewer bits may require fewer circuits and/or clock cycles compared to numbers represented using more bits. In FIG. 3, a block diagram shows an example of a DNN that changes numerical precision in different states according to an example embodiment. In state 300, the weight W for each neuron is represented by a 6-bit numerical value, with the corresponding integer decimal value shown below the neuron in parentheses. In state 302, the weight W for each neuron is represented by a 3-bit numerical value, with the corresponding integer decimal value shown below the neuron in parentheses. Note that the decimal values are presented for purposes of illustration, and any type of mapping of binary values may be used, e.g., so that the weights used in DNN calculations are between zero and one. Generally, the decimal values indicate that there is a loss of precision in the numerical representation of the weights, which may be an acceptable for reduced computational and storage resources used for the fewer-bit representations.

Hardware used to process a DNN in different numerical precision states 300, 302 may include a variable precision arithmetic unit that natively supports arithmetic in different bit-precision formats. The data input to and output from the DNN may change numerical precision in the different states 300, 302, or may retain the same numerical precision in the different states 300, 302. Note that the use of variable precision numerical representations can apply to any data used by the DNN, e.g., biases, metadata, etc. The use of different precision numerical representations in response to an audio change can be used together with other state changes of the DNN, e.g., change in sparseness as described above.

Figure 4:
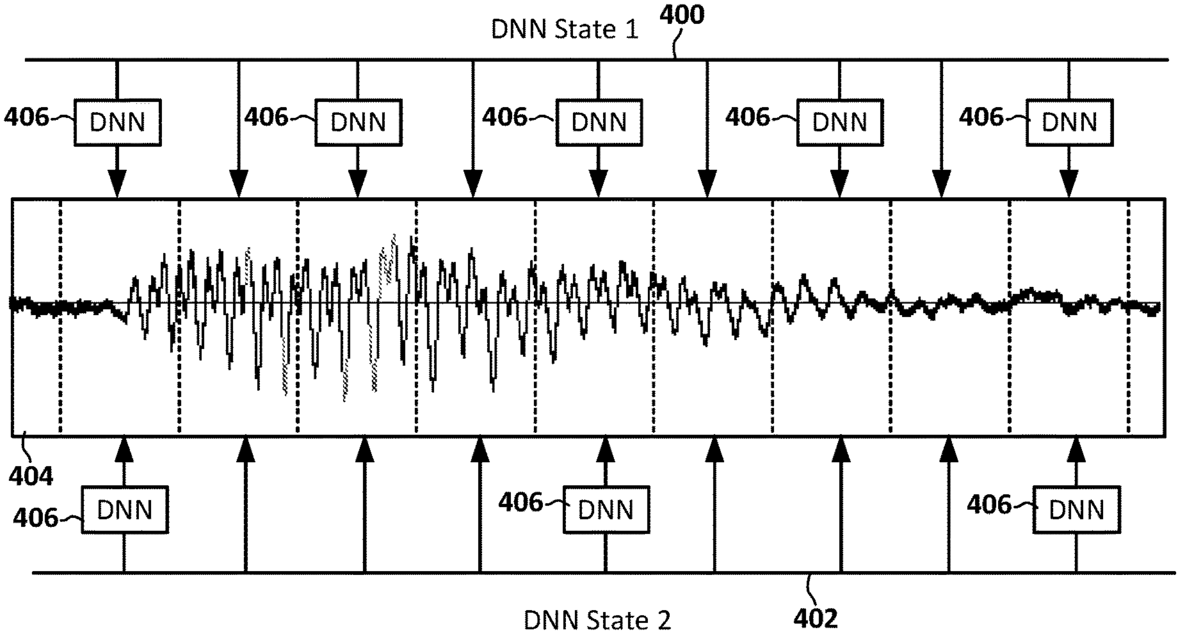
FIG. 4 is a diagram showing a neural network that is activated at different frequencies according to an example embodiment.

In FIG. 4, a block diagram shows an example of the frequency of application of a DNN to audio processing changes in different states 400, 402 according to an example embodiment. Plot 404 represents an output signal that is formed by assembling weighted overlap-add (WOLA) frames into an output signal, the boundary between frames represented by the dotted lines, although the frames themselves may overlap these boundaries somewhat. As indicated by the DNN processing blocks 406, the DNN is used to process every other WOLA frame in the first state 400 and every fourth WOLA frame in the second state 402. This will reduce the number of DNN calculations performed in the second state 402 compared to the first state, possibly with a corresponding reduction in enhancement quality with lower usage of the DNN. When the DNN 406 is not being used, it can be idled (e.g., its clock turned off) or set to a low clock speed to reduce resource consumption. The change in frequency of frame processing by a DNN can be used together with other state changes of the DNN in response to an audio change, e.g., use of different precision numerical representations and/or change in sparseness as described above.

Figures 5, 6:
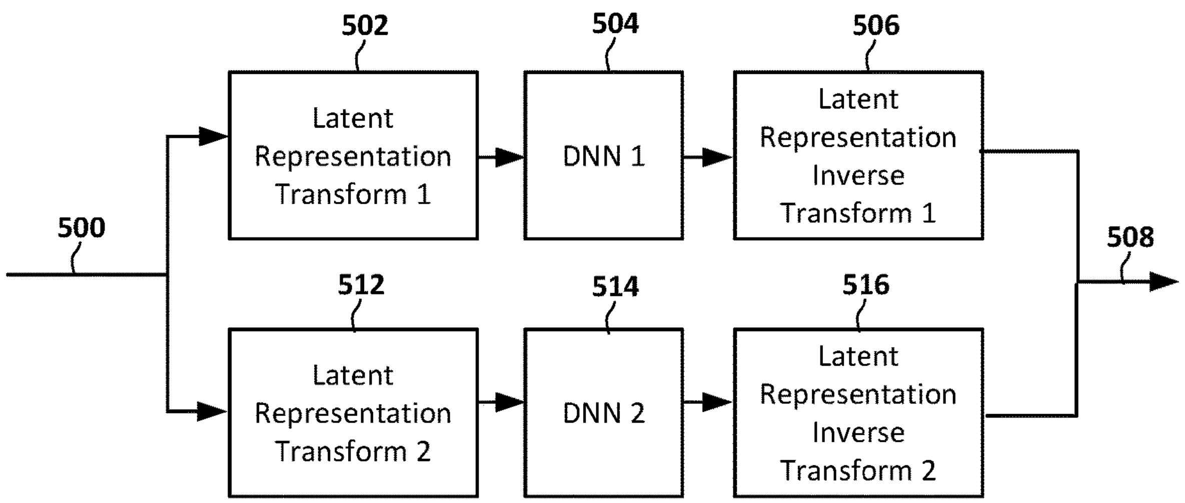
FIG. 5 is a diagram showing neural networks with different latent representations according to an example embodiment.
FIG. 6 is a table showing different events that can trigger a state change of a neural network according to an example embodiment.

In FIG. 5, a block diagram shows different states of a DNN in which different latent representations are used. Generally, a DNN as previously shown in FIG. 4 will operate using the audio signal representations available within the WOLA framework. In other embodiments, a DNN may operate independently of the WOLA framework. In such a case, the DNN may operate on any time domain or frequency domain representation of the audio signal. This is shown in FIG. 5, where an audio signal 500 is input to a latent representation 502 of the signal 500. The latent representation 502 is analogous to a domain transform (e.g., time-to-frequency transform) in that the latent representation 502 extracts features of interest from the signal, namely those features that are used by the DNN 504 for which it was developed.

Like the DNN 504, the latent representation 502 is produced through machine learning. Generally, the output of the latent representation 502 is more compact than the input signal 500, allowing the DNN 504 to operate using fewer resources. An inverse transform 506 of the latent representation is used to produce an output 508 usable elsewhere in the processing stream, e.g., as a time domain audio signal. As seen in FIG. 5, a second latent representation 512, DNN 514, and inverse representation 516 may be alternatively used, e.g., to respond to an increase or decrease in available resources. Generally, one of the other of these DNNS 504, 514 and latent representations 502, 512 may require fewer resources than the other, and so can be swapped in and out of DNN computing hardware in response to certain events. The use of a different latent representation can be used together with other state changes of the DNN in response to an audio change, e.g., use of different precision numerical representations, change in DNN sparseness, and/or change in frequency of frame processing by a DNN as described above.

As noted above, a skip RNN may be used to process the sound in a hearing device. In such an embodiment, the skip RNN can dynamically alter (e.g., pause) the updates to the recursive computations made by the network. Skip RNNs have the internal mechanism to decide whether to update their states or remain the same. This dynamic ability has the potential to speed up RNN output calculation and reduce memory read/write operations while computing the RNN output, thus saving energy. Thus, in one embodiment, a change of state of the skip RNN can involve changing an update interval of the skip RNN in response to a change in the audio path, e.g., reducing the update interval for low noise environments. A skip RNN interval update can be implemented together with other state changes of the DNN in response to an audio change, e.g., use of different precision numerical representations, change in DNN sparseness, change in frequency of frame processing by a DNN, and/or use of a different latent representation as described above.

A change in DNN state as described above may be triggered by any combination of events or conditions. In FIG. 6, a table shows events and impact on system resources (e.g., DNN complexity) according to an example embodiment. Events 600-601 relate to the signal-to-noise ratio (SNR) of the audio signal. Generally, the cleaner the signal (higher SNR), the less resources that may be needed to enhance speech and other sounds. A similar relation holds for events 602-603, which relates to whether the background noise is non-stationary or stationary. The term "stationary" generally refers to whether or not characteristics of the noise over time, e.g., wind noise may be considered stationary while a single blast of a car horn may be considered non-stationary. Generally, stationary noises require less adaptation of the DNN and other parts of the processing path, and may therefore require fewer resources when enhancing speech.

Events 604-605 also relate to background noise over time, but this type of event has more to do with fatigue of the user than with computational resources, although resource usage will still be affected. Some background noise, e.g., with high sound pressure level above a threshold and/or particular spectral characteristics that meet some threshold, can cause fatigue, making it harder for a person with hearing loss to detect speech over time. Thus, a hearing device can devote more resources to speech enhancement (or other sound enhancement) if the audio signal evidences background noise above a threshold, and further based on whether this type of background noise is detected over a period of elapsed time. Events 606-607 also relate to the user experience, in this case the amount of hearing loss of the user. Higher (more severe) hearing loss may require more computation/complexity while lower (less severe) hearing loss may require less computation/complexity. Thus, higher levels of the hearing loss may result in a lower likelihood that the change of state of the DNN lowers the resource consumption.

Events 608-609 relate to device status, in particular to available battery power. In order to maximize operating time of the device, the resource usage of a DNN may be reduced if remaining battery power is low. For example, lower levels of remaining power may result in a lower likelihood that the change of state of the DNN increases resource consumption. Other device status may be similarly used to reduce or increase DNN usage, e.g., operational temperature, interruption by higher priority processing tasks, etc. Note that these events 600-609 can be used in any combination to trigger a DNN state change. For example, different weighted combinations of the events 600-609 could be used to determining a triggering threshold. The weights could be changed based on a user preference setting, device context (e.g., current operating conditions, battery level, etc.), signal characteristics, etc.

The operation of a dynamically adjustable DNN can take advantage of sophisticated sound enhancement technologies on a device with limited computing resources.

It may be desirable to provide the end-user or a clinician the ability to tailor the device's behavior to suit the needs of a particular user. For example, if a user has mild hearing loss, then a relatively low amount of resources may be used by the DNN processing path for enhancement, thereby increasing battery life. Thus the thresholds which allow for increasing DNN complexity as described above may be set higher for this user compared to a user with more severe hearing loss. In order to easily adjust these settings, the hearing device may communicate with another device that has a more easily accessible user interface. In embodiments below, this external device is shown as a mobile device, e.g., a smart phone, although any other computing device may be used.

Figure 7:
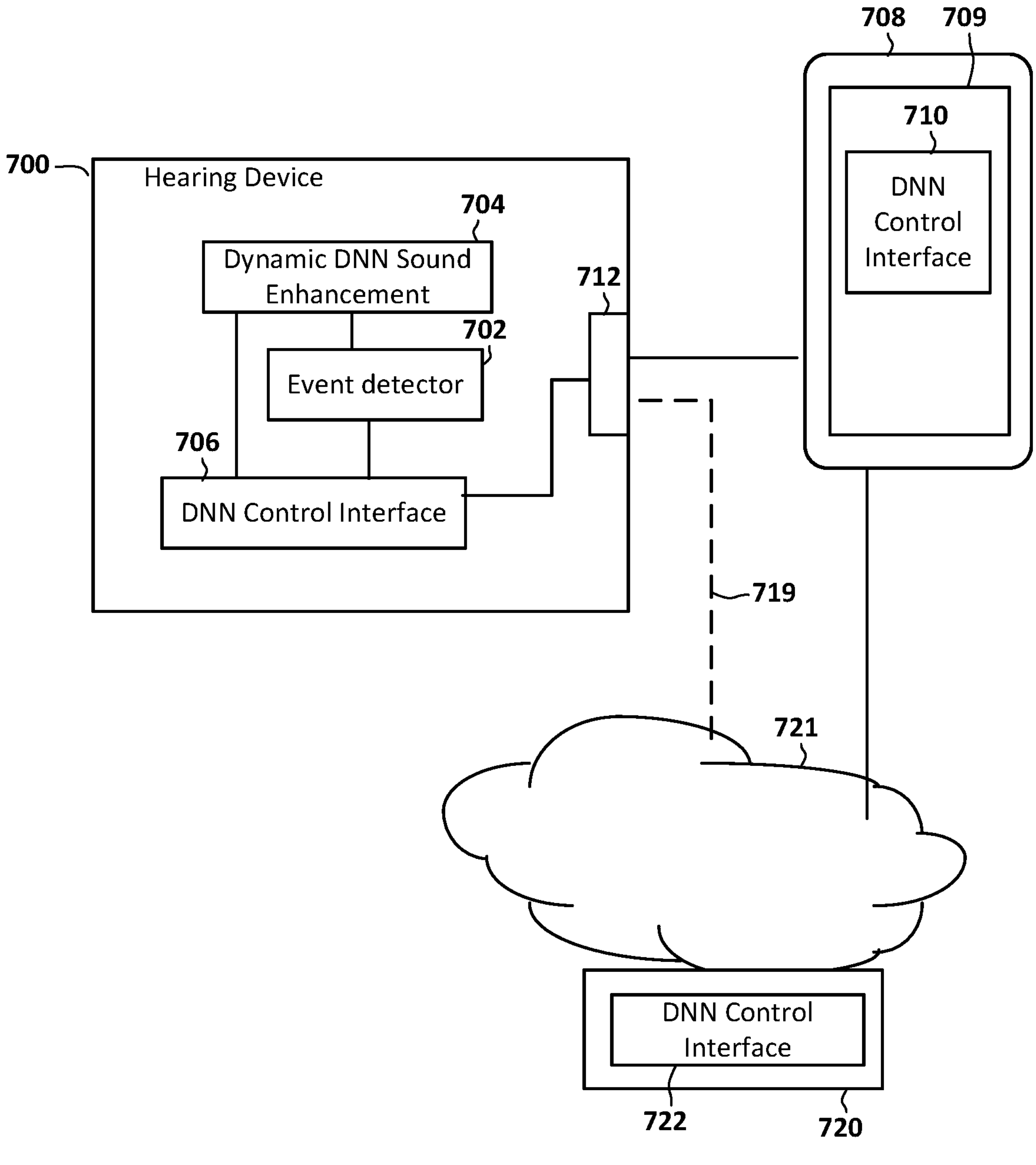
FIG. 7 is a block diagram of a system according to an example embodiment.

In FIG. 7, a block diagram shows a system for control of dynamic DNN according to an example embodiment. A hearing device 700 includes an event detector 702 and dynamically configurable DNN sound enhancer 704 as described elsewhere herein. The DNN sound enhancer 704 may select different DNN states based on signals from the detector 702. The hearing device 700 also includes a user control interface 706 that allows a user to change settings used by the detector 702 and DNN sound enhancer 704. The user interface 706 may be programmatically accessed by an external device, such as mobile device 708, which has a touchscreen 709 that displays a graphical user control interface 710. The mobile device 708 communicates with the hearing device 700 via a data interface 712, e.g., Bluetooth, USB, WiFi, etc. The graphical user interface 710 may allow the user to enable/disable the DNN sound enhancer 704, set thresholds used by the detector 702, select particular events detected by the detector that will cause a change in the DNN sound enhancer 704, etc.

In some embodiments, the hearing device 700 may be connected to a wide area network 721 (e.g., the Internet) either indirectly via the mobile device 708 or directly as indicated by dashed line 719. A network service 720 may include a control interface 722 similar to the interface 710 of the mobile device 708. This may allow changing the operation of the hearing device 700 via a web browser, for example. Other changes, such as updates to the DNN sound enhancer 704 and related components, can be performed via the network service 720.

The functionality of the DNN sound enhancer 704 and detector 702 may be augmented by the DNN control interface 710. For example, the mobile device 708 may have its own microphone and DSP functionality, e.g., for processing telephone calls, audio/video conferencing, audio/video recording, etc. This can be used to at least detect or confirm some events used to trigger a DNN state change via the detector 702. The mobile device 708 may have other functionality not present on the hearing device 700 that can be used to provide triggers, such as geolocation, proximity sensors, accelerometers, etc., which might indicate a situation where a state change is warranted.

Figure 8:
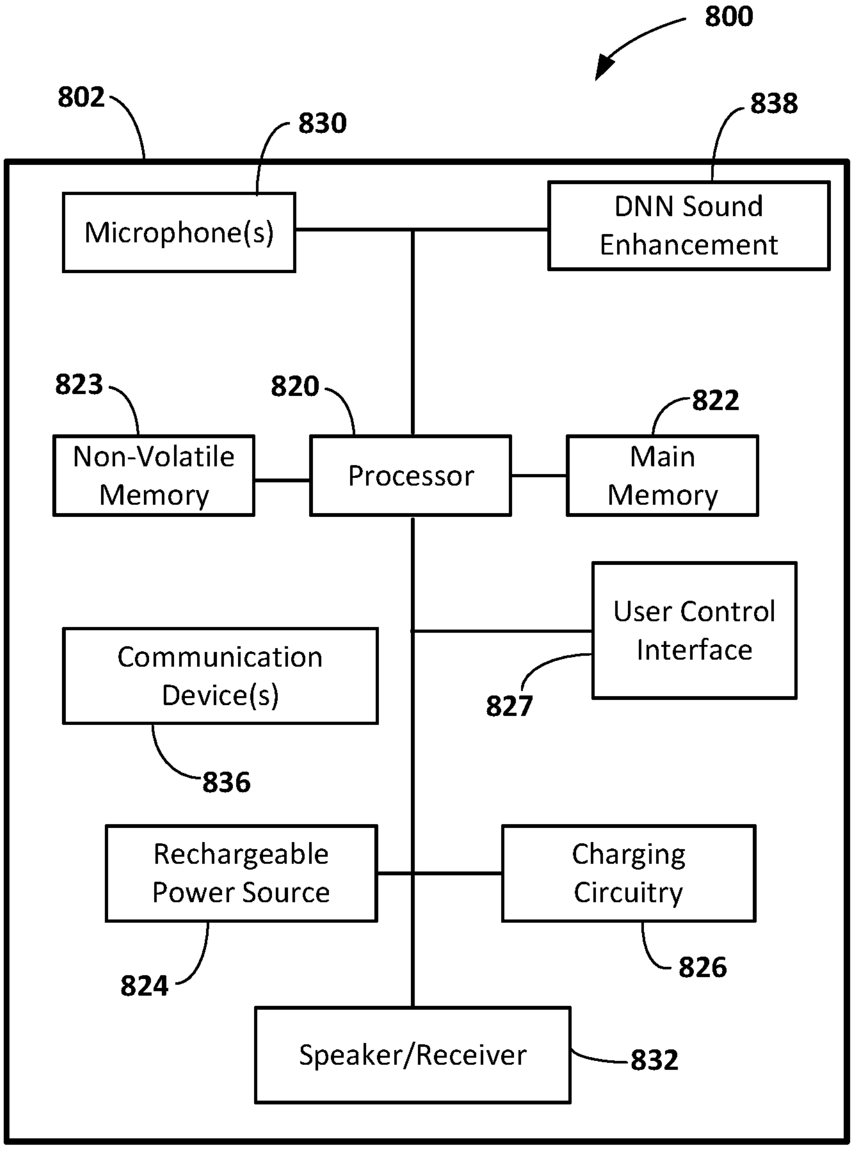
FIG. 8 is a block diagram of a hearing device according to an example embodiment.

In FIG. 8, a block diagram illustrates hardware of an ear-worn electronic device 800 in accordance with any of the embodiments disclosed herein. The device 800 includes a housing 802 configured to be worn in, on, or about an ear of a wearer. The device 800 shown in FIG. 8 can represent a single hearing device configured for monaural or single-ear operation or one of a pair of hearing devices configured for binaural or dual-ear operation. The device 800 shown in FIG. 8 includes a housing 802 within or on which various components are situated or supported. The housing 802 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 800 includes a processor 820 operatively coupled to a main memory 822 and a non-volatile memory 823. The processor 820 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 820 can include or be operatively coupled to main memory 822, such as RAM (e.g., DRAM, SRAM). The processor 820 can include or be operatively coupled to non-volatile (persistent) memory 823, such as ROM, EPROM, EEPROM or flash memory. As will be described in detail hereinbelow, the non-volatile memory 823 is configured to store instructions that facilitate using a DNN based sound enhancer.

The hearing device 800 includes an audio processing facility operably coupled to, or incorporating, the processor 820. The audio processing facility includes audio signal processing circuitry (e.g., analog front-end, analog-to-digital converter, digital-to-analog converter, DSP, and various analog and digital filters), a microphone arrangement 830, and a speaker or receiver 832. The microphone arrangement 830 can include one or more discrete microphones or a microphone array(s) (e.g., configured for microphone array beamforming). Each of the microphones of the microphone arrangement 830 can be situated at different locations of the housing 802. It is understood that the term microphone used herein can refer to a single microphone or multiple microphones unless specified otherwise.

The hearing device 800 may also include a user interface with a user control interface 827 operatively coupled to the processor 820. The user control interface 827 is configured to receive an input from the wearer of the hearing device 800. The input from the wearer can be any type of user input, such as a touch input, a gesture input, or a voice input. The user control interface 827 may be configured to receive an input from the wearer of the hearing device 800, e.g., to change settings.

The user interface 827 can include manually-actuatable buttons and/or switches (e.g., mechanical, capacitive, and/or optical switches). The user interface 827 may alternatively, or additionally, include a voice recognition interface configured to facilitate wearer control of the device 800 via voice commands. The voice recognition interface is preferably configured to discriminate between vocal sounds produced from the wearer of the device 800 (e.g., "own voice" recognition via an acoustic template developed for the wearer) and vocal sounds produced from other persons in the vicinity of the device 800. The user interface 827 may alternatively, or additionally, include a gesture detection interface configured to facilitate wearer control of the device 800 via gestures (e.g., non-contacting hand and/or finger gestures made in proximity to the device 800).

The hearing device 800 also includes a DNN sound enhancement module 838 operably coupled to the processor 820. The DNN sound enhancement module 838 can be implemented in software, hardware, or a combination of hardware and software. The DNN sound enhancement module 838 can be a component of, or integral to, the processor 820 or another processor coupled to the processor 820. The DNN sound enhancement module 838 is configured to provide enhanced sound (e.g., speech) using a set of machine learning models.

According to various embodiments, the DNN sound enhancement module 838 includes or is coupled to a DNN model that performs sound enhancement on the audio signal and an audio feature detector configured to detect an audio change via the processing path that triggers a change a state of the DNN model. The change of state affects resource consumption by the DNN model. After the change of state, the DNN model performs the speech enhancement in the changed state. Other signal processing modules of the device 800 form an analog signal based on the enhanced digitized sound signal, the analog signal being reproduced via the receiver 832.

The hearing device 800 can include one or more communication devices 836 coupled to one or more antenna arrangements. For example, the one or more communication devices 836 can include one or more radios that conform to an IEEE 802.11 (e.g., WiFi®) or Bluetooth® (e.g., BLE, Bluetooth® 4. 2, 5.0, 5.1, 5.2 or later) specification, for example. In addition, or alternatively, the hearing device 800 can include a near-field magnetic induction (NFMI) sensor (e.g., an NFMI transceiver coupled to a magnetic antenna) for effecting short-range communications (e.g., ear-to-ear communications, ear-to-kiosk communications).

The hearing device 800 also includes a power source, which can be a conventional battery, a rechargeable battery (e.g., a lithium-ion battery), or a power source comprising a supercapacitor. In the embodiment shown in FIG. 8, the hearing device 800 includes a rechargeable power source 824 which is operably coupled to power management circuitry for supplying power to various components of the hearing device 800. The rechargeable power source 824 is coupled to charging circuitry 826. The charging circuitry 826 is electrically coupled to charging contacts on the housing 802 which are configured to electrically couple to corresponding charging contacts of a charging unit when the hearing device 800 is placed in the charging unit. The charging circuitry 826 may include a power detector that detects an available battery power (also referred to as the remaining power level) of the device 800 and provides trigger to DNN sound enhancement module 838.

Figure 9:
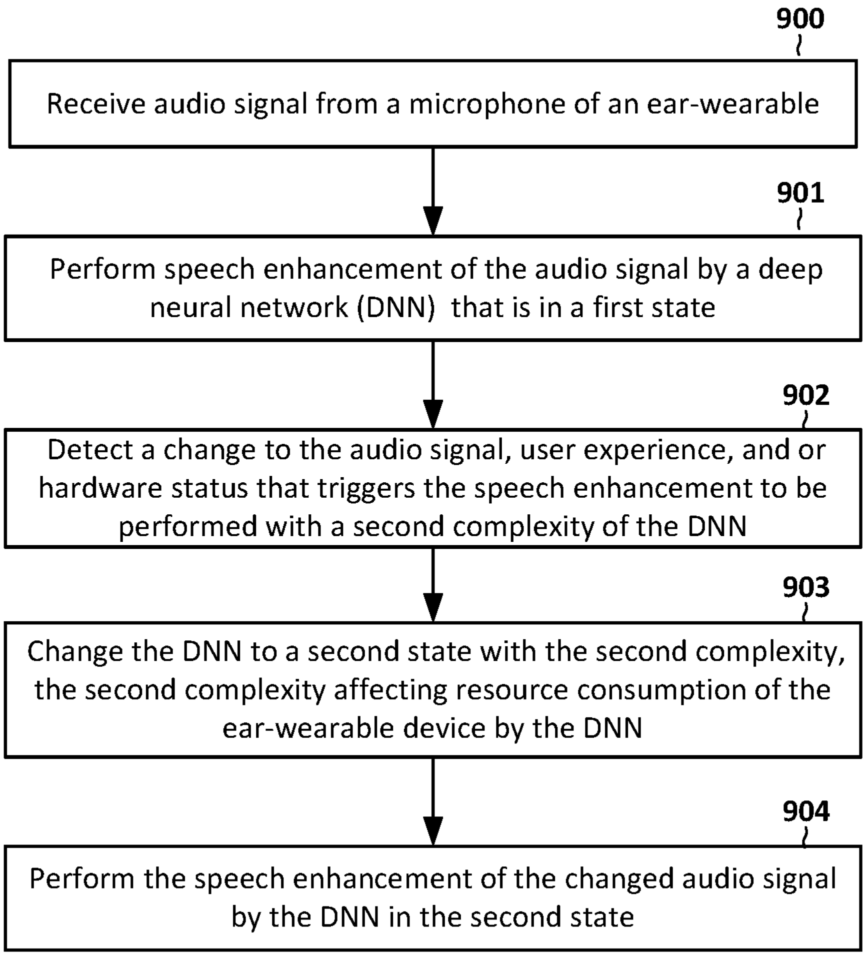
FIG. 9 is a flowchart of a method according to an example embodiment.

In FIG. 9, a flowchart shows a method according to an example embodiment. Generally, the method can be implemented within an infinite loop in a hearing device. The method involves receiving 900 audio from a microphone of an ear-wearable device, the microphone producing an audio signal. Speech enhancement of the audio signal is performed 901 by a DNN that is in a first state with a first complexity. The speech-enhanced audio signal is reproduced in an ear of a user via a receiver by the DNN in the first state. A change to the audio signal, user experience, or device status is detected 902 that triggers the speech enhancement to be performed with a second complexity of the DNN. In response the change, the DNN is changed 903 to a second state with the second complexity, the second complexity affecting resource consumption of the ear-wearable device by the DNN. The speech enhancement of the changed audio signal is thereafter performed 904 by the DNN in the second state.

This document discloses numerous examples, including but not limited to the following:

Example 1 is an ear-wearable device, comprising an audio processing path that receives an audio signal from a microphone of the ear-wearable device and reproduces the audio signal at a receiver that is placed within an ear of a user. The device includes a deep neural network (DNN) coupled to the audio processing path that performs speech enhancement on the audio signal. An audio feature detector of the device is operable to: detect an audio change via the processing path that triggers a change of state of the DNN, the change of state affecting resource consumption by the DNN; and apply the change of state to the DNN, the DNN performing the speech enhancement in the changed state.

Example 2 includes the ear-wearable device of example 1, wherein the audio change comprises a change in signal-to-noise ratio (SNR) of the audio signal, a decrease in the SNR resulting in an increase in the resource consumption by the DNN and an increase in the SNR resulting in a decrease in the resource consumption by the DNN. Example 3 includes the ear-wearable device of example 1 or 2, wherein the audio change comprises a change in background noise of the audio signal. Example 4 includes the ear-wearable device of example 3, wherein the change in the background noise comprises the background noise becoming stationary, resulting in a decrease in the resource consumption by the DNN. Example 5 includes the ear-wearable device of any one of examples 1-4, wherein the audio change comprises an elapsed time during which the audio signal evidences background noise above a threshold, wherein the change of state increases the resource consumption as the elapsed time increases.

Example 6 includes the ear-wearable device of any one of examples 1-5, wherein the change of state of the DNN comprises a change in sparsity of the DNN.

Example 7 includes the ear-wearable device of any one of examples 1-6, wherein the change of state of the DNN comprises a change in a frequency in which the DNN processes weighted overlap add frames. Example 8 includes the ear-wearable device of any one of examples 1-7, wherein the change of state of the DNN comprises a change in number of bits used to represent weights of neurons of the DNN and to calculate activation of the neurons.

Example 9 includes the ear-wearable device of any one of examples 1-8, wherein the change of state of the DNN comprises a change in a latent representation of the audio signal used as input to the DNN. Example 10 includes the ear-wearable device of any one of examples 1-9, wherein the DNN comprises a skip recurrent neural network (RNN), and wherein the change of state of the skip RNN comprises changing an update interval of the skip RNN. Example 11 includes the ear-wearable device of any one of examples 1-10, wherein audio feature detector determines an amount of hearing loss of the user from a configuration of the ear-wearable device, higher levels of the hearing loss resulting in a lower likelihood that the change of state lowers the resource consumption.

Example 12 includes the ear-wearable device of any one of examples 1-11, wherein audio feature detector determines a remaining power level of the ear-wearable device, lower levels of remaining power resulting in a lower likelihood that the change of state increases the resource consumption. Example 13 includes the ear-wearable device of any one of examples 1-12, wherein the resource consumption comprises consumption of one or more computing resources that affects battery life of the ear-wearable device. Example 14 includes the ear-wearable device of example 13, where the computing resources comprise any combination of memory used to store data of the DNN, processor cycles used to calculate outputs of the DNN, clock speed used by the DNN, and input-output bus usage by the DNN.

Example 15 is a method comprising: receiving audio from a microphone of an ear-wearable device, the microphone producing an audio signal; performing speech enhancement of the audio signal by a deep neural network (DNN) that is in a first state with a first complexity, the speech-enhanced audio signal being reproduced in an ear of a user via a receiver; detecting a change to the audio signal that triggers the speech enhancement being performed with a second complexity of the DNN; changing the DNN to a second state with the second complexity, the second complexity affecting resource consumption of the ear-wearable device by the DNN; and performing the speech enhancement of the changed audio signal by the DNN in the second state.

Example 16 includes the method of example 15, wherein the change to the audio signal comprises a change in signal-to-noise ratio (SNR) of the audio signal, a decrease in the SNR resulting in an increase in the resource consumption by the DNN and an increase in the SNR resulting in a decrease in the resource consumption by the DNN. Example 17 includes the method of example 15 or 16, wherein the change to the audio signal comprises a change in background noise of the audio signal. Example 18 includes the method of any one of examples 15-17, wherein the change to the audio signal comprises an elapsed time during which the audio signal evidences background noise above a threshold, wherein the second complexity is greater than the first complexity. Example 19 includes the method of any one of examples 15-18, wherein changing the DNN to the second state comprises changing a sparsity of the DNN.

Example 20 includes the method of any one of examples 15-19, wherein changing the DNN to the second state comprises changing a frequency in which the DNN processes weighted overlap add frames. Example 21 includes the method of any one of examples 15-20, wherein changing the DNN to the second state comprises changing a number of bits used to represent weights of nodes of the DNN. Example 22 includes the method of any one of examples 15-21, wherein changing the DNN to the second state changing a latent representation of the audio signal used as input to the DNN. Example 23 includes the method of any one of examples 15-22, further comprising determining an amount of hearing loss from a configuration of the ear-wearable device, higher levels of hearing loss resulting in a lower likelihood that the change of state reduces a complexity of the DNN. Example 24 includes the method of any one of examples 15-23, further comprising determining a remaining power level of the ear-wearable device, lower levels of remaining power resulting in a lower likelihood that the change of state increases a complexity of the DNN.

Example 25 is an ear-wearable device, comprising an audio processing path that receives an audio signal from a microphone of the ear-wearable device and reproduces the audio signal at a receiver that is placed within a user's ear. The device includes a deep neural network (DNN) coupled to the audio processing path that performs speech enhancement on the audio signal. A power detector of the device is operable to: detect an available battery power of the ear-wearable device; and based on the available battery power reaching a threshold, change a state of the DNN which affects resource consumption by the DNN.

Example 26 includes the ear-wearable device of example 25, wherein the change of state of the DNN comprises a change in sparsity of the DNN. Example 27 includes the ear-wearable device of example 25 or 26, wherein the change of state of the DNN comprises a change in a frequency in which the DNN processes weighted overlap add frames. Example 28 includes the ear-wearable device of any one of examples 25-27, wherein the change of state of the DNN comprises a change in number of bits used to represent weights of nodes of the DNN. Example 29 includes the ear-wearable device of any one of examples 25-28, wherein the change of state of the DNN comprises a change in a latent representation of the audio signal used as input to the DNN.

Example 30 is a method, comprising: receiving an audio signal from a microphone of an ear-wearable device; performing speech enhancement on the audio signal via a deep neural network (DNN), the speech-enhanced audio signal being reproduced at a receiver that is placed within a user's ear; detecting an available battery power of the ear-wearable device; and based on the available battery power reaching a threshold, changing a state of the DNN which affects resource consumption by the DNN.

Example 31 includes the method of example 30, wherein changing the state of the DNN comprises changing the sparsity of the DNN. Example 32 includes the method of example 30 or 31, wherein changing the state of the DNN comprises changing a frequency in which the DNN processes weighted overlap add frames. Example 33 includes the method of any one of examples 30-32, wherein changing the state of the DNN comprises a changing a number of bits used to represent weights of nodes of the DNN. Example 34 includes the method of any one of examples 30-33, wherein changing the state of the DNN comprises changing a latent representation of the audio signal used as input to the DNN.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An ear-wearable device, comprising:

an audio processing path that receives an audio signal from a microphone of the ear-wearable device and reproduces the audio signal at a receiver that is placed within an ear of a user;

a deep neural network (DNN) coupled to the audio processing path that performs speech enhancement on the audio signal; and an audio feature detector operable to:

detect an audio change via the audio processing path that triggers a change of state of the DNN, the change of state affecting resource consumption by the DNN; and apply the change of state to the DNN, the DNN performing the speech enhancement in the changed state.

2. The ear-wearable device of claim 1, wherein the audio change comprises a change in signal-to-noise ratio (SNR) of the audio signal, a decrease in the SNR resulting in an increase in the resource consumption by the DNN and an increase in the SNR resulting in a decrease in the resource consumption by the DNN.

3. The ear-wearable device of claim 2, wherein the audio change comprises an elapsed time during which the audio signal evidences background noise above a threshold, wherein the change of state increases the resource consumption as the elapsed time increases.

4. The ear-wearable device of claim 1, wherein the audio change comprises a change in background noise of the audio signal.

5. The ear-wearable device of claim 4, wherein the change in the background noise comprises the background noise becoming stationary, resulting in a decrease in the resource consumption by the DNN.

6. The ear-wearable device of claim 1, wherein the change of state of the DNN comprises copying a different DNN representation into DNN processing hardware.

7. The ear-wearable device of claim 1, wherein the change of state of the DNN comprises a change in a latent representation of the audio signal used as input to the DNN.

8. The ear-wearable device of claim 1, wherein the DNN comprises a skip recurrent neural network (RNN), and wherein the change of state of the skip RNN comprises changing an update interval of the skip RNN.

9. The ear-wearable device of claim 1, wherein the audio feature detector triggers the change in state based on a remaining power level of the ear-wearable device, lower levels of remaining power resulting in a lower likelihood that the change of state increases the resource consumption.

10. The ear-wearable device of claim 1, wherein the resource consumption comprises consumption of one or more computing resources that affects battery life of the ear-wearable device.

11. The ear-wearable device of claim 10, where the computing resources comprise any combination of memory used to store data of the DNN, processor cycles used to calculate outputs of the DNN, clock speed used by the DNN, and input-output bus usage by the DNN.

12. A method, comprising:

receiving audio from a microphone of an ear-wearable device, the microphone producing an audio signal;

performing speech enhancement of the audio signal by a deep neural network (DNN) that is in a first state with a first complexity, the speech-enhanced audio signal being reproduced in an ear of a user via a receiver;

detecting a change to the audio signal that triggers the speech enhancement being performed with a second complexity of the DNN;

changing the DNN to a second state with the second complexity, the second complexity affecting resource consumption of the ear-wearable device by the DNN; and performing the speech enhancement of the changed audio signal by the DNN in the second state.

13. The ear-wearable device of claim 1, wherein the change of state trades off resource utilization with model inference performance.

14. The ear-wearable device of claim 1, further comprising a user control interface that allows setting a threshold for triggering the change in state of the DNN in response to the audio change.

15. An ear-wearable device, comprising:

an audio processing path that receives an audio signal from a microphone of the ear-wearable device and reproduces the audio signal at a receiver that is placed within an ear of a user;

a system detector that determines a system change in the ear-wearable device that affects resource consumption of the ear-wearable device and provides a signal in response thereto; and a deep neural network (DNN) coupled to the audio processing path that performs speech enhancement on the audio signal, the ear-wearable device operable to apply a change of state to the DNN in response to the signal, the change of state comprising at least one of a change of complexity of the DNN and a change in usage of the DNN, the change of state affecting the resource consumption by the DNN in response to the system change, the DNN performing the speech enhancement with the changed state.

16. The ear-wearable device of claim 15, wherein the change of state trades off resource utilization with model inference performance.

17. The ear-wearable device of claim 15, further comprising a user control interface that allows setting a threshold for triggering the change in state of the DNN in response to the system change.

18. The ear-wearable device of claim 1, wherein the change of state comprises a change of complexity of the DNN.

19. The ear-wearable device of claim 1, wherein the change of state comprises a change in usage of the DNN.

20. The ear-wearable device of claim 18, wherein the audio feature detector triggers the change in complexity based on an amount of hearing loss of the user from a configuration of the ear-wearable device, higher levels of the hearing loss resulting in a lower likelihood that the change of state lowers the resource consumption.

21. The ear-wearable device of claim 19, wherein the change of usage of the DNN comprises a change in a frequency in which the DNN processes weighted overlap add frames.

22. The ear-wearable device of claim 18, wherein the change of complexity of the DNN comprises at least one of:

a change in number of bits used to represent weights of neurons of the DNN and to calculate activation of the neurons; and change in sparsity of the DNN.

* * * * *